Dec. 23, 1958          G. E. FISHER          2,866,062
ELECTRICAL HEATING ELEMENTS
Filed March 5, 1956
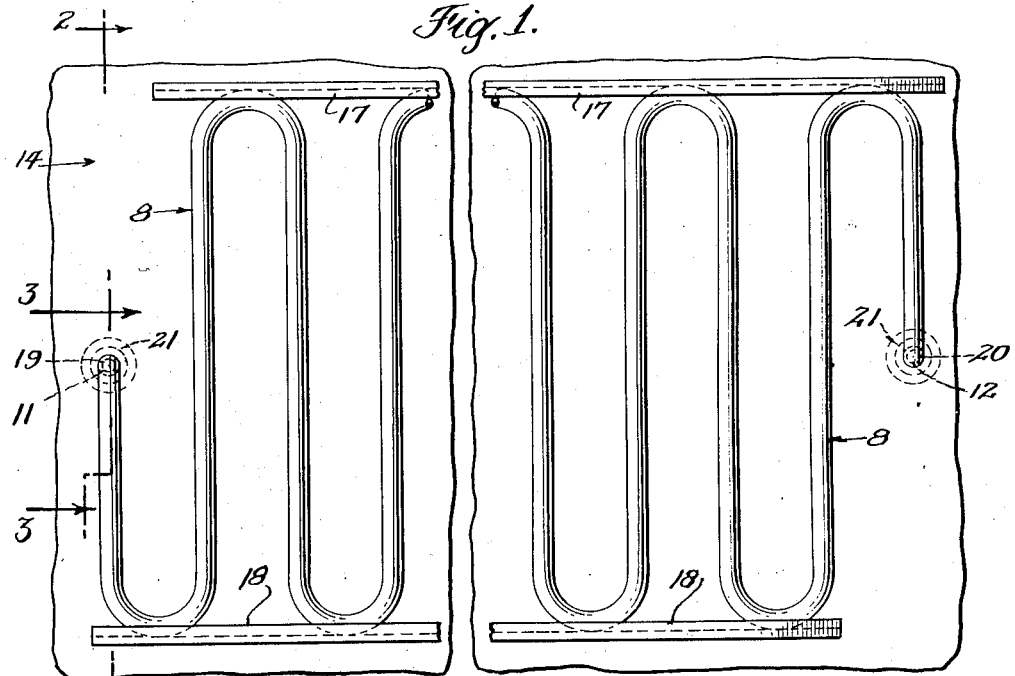
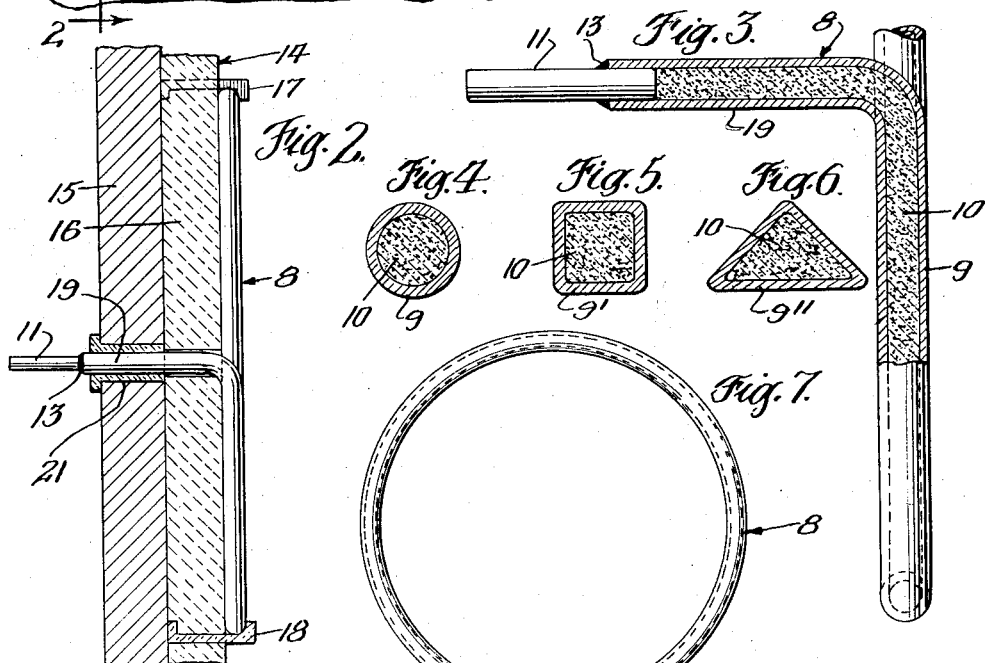
INVENTOR
George E. Fisher
BY
Synnestvedt & Lechner
ATTORNEYS United States Patent Office 2,866,062
Patented Dec. 23, 1958

2,866,062

ELECTRICAL HEATING ELEMENTS

George E. Fisher, Ambler, Pa., assignor to Trent, Inc., Philadelphia, Pa., a corporation of Delaware Application March 5, 1956, Serial No. 569,436

1 Claim. (Cl. 201—63)

This invention relates to heating elements for use in industrial equipment such as furnaces operating at high temperatures as distinguished from relatively low-temperature equipment such as domestic ranges, water heaters and the like.

One of the objects of the invention is the provision of a high-temperature heating element of tubular form.

Another object of the invention is the provision of a high-wattage heating element of tubular form.

Another object of the invention is to provide a heating element, the resistive portion of which is in the form of an elongated hollow tube filled with compacted electrical insulating material.

Another object of the invention is the provision of a tubular heating element having a higher resistance per unit of length than a customary solid rod heating element of the same diameter, thus enabling operation at higher voltages and requiring less resistor material for the same wattage than required in solid rod types of heating elements.

A further object resides in providing a heating element having a lower average cross section temperature than known solid rod types when both have the same outside temperature.

A further object resides in the provision of a hollow but hermetically-sealed high-temperature, high-wattage heating element.

Another object of the invention is the provision of a high-wattage, high-temperature heating element of tubular form which is adapted to be readily formed or bent into various shapes.

Another object is the provision of a tubular heating element which is adapted to be rolled or swaged to alter its diameter, length and wall thickness, thus enabling adjustment of its resistance to meet particular specification requirements.

How the foregoing is accomplished together with other objects and advantages of the invention will be apparent from the following description and drawings wherein:

Figure 1 is an elevational view of a heating unit illustrating an application of the invention to a furnace wall;

Figure 2 is a vertical section taken on the line 2—2 of Figure 1;

Figure 3 is an enlarged section through the unit as taken on the line 3—3 of Figure 1;

Figures 4, 5 and 6 illustrate various forms the tube may take in cross section; and Figure 7 illustrates the heating element arranged in ring-like form.

One form of the invention which is particularly adaptable for use in high-temperature industrial furnaces is best illustrated in Figures 3, 4 and 7. The heating element 8 comprises the resistive unit 9, which is tubular in form, electrical insulating material 10 on the inside of the tube, and electrical terminals 11 and 12 on each end. These terminals extend into the ends of the tube 9 and are welded, as indicated at 13, so as to hermetically seal the tube.

The unit 9 is formed from any metal having good resistance characteristics and suitable for use under the required operating temperatures and conditions. In use, the terminals 10 and 11 are connected to a source of electrical power and the current flow is through the tube 9 only.

The insulating material is used inside of the tube for several reasons: For example, in manufacturing a sinuously-arranged heating element such as shown in Figure 1, a tube of proper length and wall dimensions is first filled with insulating material which is preferably compacted therein. The tube is then formed into the desired sinuous shape, the insulating material permitting the tube to be bent without collapsing and without cracks appearing at the points of curvature. Also, in some instances the required peripheral shape of the unit may be somewhat complex and so necessitate pressing, rolling or swaging to obtain desired shape. Furthermore, rolling or swaging is used in adjusting resistance of the tube inasmuch as the length, diameter and wall thickness are effected by these operations. In either of these latter instances the insulating material prevents the tube collapse.

In any of the foregoing operations, the material is highly compacted and, in effect, forms a hard core. This lends support to the unit when the same is operatively mounted in a furnace. Preferably the insulating material is a refractory type which not only is a good electrical insulator but is also able to withstand the high temperatures involved.

It is pointed out that after an element has been formed, it is possible in certain instances to remove the insulating material and, from an electrical standpoint, the element will operate just as well without the insulating material.

The hermetic sealing of the ends of the resistor unit is an important feature of the invention. This sealing, of course, keeps out oxygen or other undesired gases. Thus, in operation, and particularly at the high temperatures involved, there can be no continued oxidation of the interior. While there may be oxidation of the exterior, the hermetic sealing cuts the possibility of oxidation at least in half and thus, greatly prolongs the life of the unit.

The use of the insulating material is not only important as mentioned heretofore but, in addition, is important from the hermetic sealing standpoint because the filling of the tube tends to purge oxygen (or other gases) therein and thus reduces the potential danger of oxidation. Also, even though a flaw may develop in the unit in service, for example, a small crack or a puncture, the material, being highly compacted, reduces the possibility of the interior walls being attacked.

Although the resistive element 9 is preferably tubular in form as shown in Figure 4, it may take other forms such, for example, as the square form 9' of Figure 5 or the triangular form 9" of Figure 6. Thus, it will be understood herein that the words "tube" and "tubular" are used in generic sense and apply to an elongated shell-like resistive element equivalent to the elements of Figures 4, 5 and 6.

In Figures 1 and 2 I have shown the heating element 8 bent to form a heating unit of loop form and in this instance, it is shown applied to a furnace wall 14 having an outer casing 15 and a refractory lining 16. The heating unit is mounted by means of horizontal refractory porcelain members 17 and 18 engaging the unit at the bends of the loops. The end portions 19 and 20 of the heating unit are bent outwardly so that the terminal ends 11 and 12 lie outside of the furnace. Suitable insulators 21 surround the end portions 19 and 20 where they pass through the furnace casing 15. In Figure 7 the heating element 8 is shown bent into ring-like form.

In the preferred form of heating element described above, i. e., a refractory-filled tube with terminal ends welded to the tube so that the tube itself is the heating element, a novel, heavy-duty heating element is provided which is adapted to be operated at very high wattage and temperatures as high as 2100° F. and, therefore, one which can be employed in industrial equipment such as industrial furnaces.

A heating element so constructed has many advantages over heating elements of the solid rod type now employed, as will now appear.

Comparing the tubular heating element of the invention with a solid rod heating element of the same diameter, it is pointed out that a tube of the same diameter as a solid rod, because of its smaller cross sectional area, has a higher resistance per unit of length than the solid rod and, therefore, can be operated at higher voltages than the solid rod.

Since the tubular heating element has a higher resistance per unit of length than the solid rod of the same diameter, it will take less resistor material for the same voltage than the solid rod heating element.

Also, the tubular heating element has a greater radiating surface per unit of length per unit of resistance than the solid rod type heating element. For example, a one-ohm resistor solid rod of ¼-inch diameter and 12 inches long would have much less radiating surface than a 12-inch one-ohm resistor of the type described herein.

It is further pointed out that the tubular heating element has a lower average cross section temperature than a solid rod type heating element when both have the same outside temperature.

I claim:

In a heating element for high temperature furnaces, a metal electrical resistance arranged in the form of an elongated hollow tube, means hermetically sealing said tube, compacted insulating material in said tube, the insulating material being hermetically sealed in the tube by said sealing and electrical power terminals connected to and disposed adjacent each end of said tube.

References Cited in the file of this patent

UNITED STATES PATENTS

| | | |
|---|---|---|
| 912,985 | Aalborg | Feb. 23, 1909 |
| 1,474,723 | Levinson | Nov. 20, 1923 |
| 2,472,930 | Wilkes | June 14, 1949 |

FOREIGN PATENTS

| | | |
|---|---|---|
| 11,128 | Great Britain | Sept. 17, 1908 |
| 658,966 | France | June 22, 1929 |